US011097261B1

(12) United States Patent
Landers et al.

(10) Patent No.: US 11,097,261 B1
(45) Date of Patent: Aug. 24, 2021

(54) SINGLE THREADED COMPOSITE FIBERS AND YARNS FOR THE DEGRADATION OF AND PROTECTION AGAINST TOXIC CHEMICALS AND BIOLOGICAL AGENTS

(71) Applicant: Combat Capabilities Development Command, Chemical Biological Center, APG, MD (US)

(72) Inventors: John M. Landers, Riverton, NJ (US); Christopher J Karwacki, Churchville, MD (US); Trenton M Tovar, Parkville, MD (US); Gregory W Peterson, Bel Air, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 107 days.

(21) Appl. No.: 16/382,373

(22) Filed: Apr. 12, 2019

Related U.S. Application Data

(60) Provisional application No. 62/658,910, filed on Apr. 17, 2018.

(51) Int. Cl.
*B01J 35/00* (2006.01)
*B01J 35/06* (2006.01)
*B01J 37/00* (2006.01)
*B01J 35/10* (2006.01)
*B01J 21/06* (2006.01)
*A62D 3/30* (2007.01)
*A62D 101/02* (2007.01)

(52) U.S. Cl.
CPC ............... *B01J 35/06* (2013.01); *A62D 3/30* (2013.01); *B01J 21/066* (2013.01); *B01J 35/1004* (2013.01); *B01J 35/1052* (2013.01); *B01J 37/0009* (2013.01); *A62D 2101/02* (2013.01)

(58) Field of Classification Search
None
See application file for complete search history.

(56) References Cited

U.S. PATENT DOCUMENTS

| | | | | |
|---|---|---|---|---|
| 8,877,677 | B1 * | 11/2014 | Rossin | B01J 20/0218 502/400 |
| 9,034,289 | B1 * | 5/2015 | Peterson | B01D 51/10 423/239.1 |
| 2010/0113857 | A1 * | 5/2010 | Ramakrishna | D01F 1/10 588/299 |
| 2016/0257783 | A1 * | 9/2016 | Boydston | C08G 65/40 |

OTHER PUBLICATIONS

Bao et al, novel agarose and agar fibers; fabrication and characterizaion, materials letters, 64, pp. 2435-2437 (Year: 2010).*

* cited by examiner

*Primary Examiner* — Stefanie J Cohen
(74) *Attorney, Agent, or Firm* — Ulysses John Biffoni

(57) ABSTRACT

The present invention relates to single thread composite fibers comprising at least one binder and at least one active catalyst for the capture and degradation of chemical threats such as chemical warfare agents (CWA), biological warfare agents, and toxic industrial chemicals (TIC) and a method for producing the same. The invention fibers are applicable to the fields of protective garments, filtration materials, and decontamination materials.

16 Claims, 3 Drawing Sheets

SINGLE THREADED COMPOSITE FIBERS AND YARNS FOR THE DEGRADATION OF AND PROTECTION AGAINST TOXIC CHEMICALS AND BIOLOGICAL AGENTS

CROSS-REFERENCE TO RELATED APPLICATIONS

This application claims the benefit of priority of U.S. Provisional Patent Application No. 62/658,910, filed Apr. 17, 2018, the contents of which are incorporated herein by reference.

GOVERNMENT INTEREST

The invention described herein may be manufactured, used and licensed by or for the United States Government.

FIELD OF INVENTION

The present invention generally relates to fibers that can be used to capture and degrade toxic chemical and biological agents, methods of producing the same, and methods of using the same to produce protective garments and filter materials.

BACKGROUND OF THE INVENTION

Vapors of chemical warfare agents ("CWA") pose a lethal threat to anyone exposed, yet the mitigation of that threat through the use of protective yet breathable garments presents a severe engineering challenge. While past technologies have focused on impermeable membranes that prevent molecular diffusion from occurring in either direction, they are often associated with a high level of discomfort and thermal burden for the wearer of the protective garment. In order to alleviate these issues, recent efforts have proposed the incorporation of catalytically active components into breathable membranes or fabrics that will not compromise protection. For instance, fabrics functionalized with catalytically active nanocomponents have been demonstrated by i) dip coating pre-woven fabrics into a solution containing active catalysts or ii) electrospinning the active catalysts directly with the polymer of interest into a mat.

An example of the dip coating method is reported in the article Wallace, R., Giannakoudakis, D. A., Florent, M., Karwacki, C. J. & Bandosz, T. *Ferrihydrite deposited on cotton textiles as protection media against the chemical warfare agent surrogate (2-chloroethyl ethyl sulfide)*. Journal of Materials Chemistry A 5, 4972-4981, doi:10.1039/C6TA09548H (2017). However, while this method is a ready textile technology that can be immediately implemented at the level of industrial production, it suffers from low catalyst weight loading.

An example of the electrospinning of active catalyst is reported in Lu, A. X. et al. *MOFabric: Electrospun Nanofiber Mats from PVDF/UiO-66-NH2 for Chemical Protection and Decontamination*. ACS Applied Materials & Interfaces 9, 13632-13636, doi:10.1021/acsami.7b01621 (2017). While the electrospinning method has seen progress towards development for industrial plant production, a commercial product arising from this method has yet to materialize.

US 2010/0113857 to Ramakrishna teaches an electric-spun fiber comprising polymeric absorbent having a metal oxide coating of detoxification particles.

Accordingly, it is an object of the present invention to provide a fiber with high loading of active catalyst (up to 90%) that can be more readily implemented at the level of industrial production and used in protective garments.

SUMMARY OF THE INVENTION

A first aspect of the invention relates to a single thread composite fiber that may be used to capture and/or degrade chemical threats such as chemical warfare agents, biological warfare agents and toxic industrial chemicals.

In certain embodiments, the single thread composite fiber comprises a uniform distribution of at least one polymeric binder and at least one catalytic active material reactive with a toxic agent, to absorb, chemisorb, or decompose the toxic agent.

In certain embodiments, the single thread composite fiber comprises a high loading of at least one catalytic active material in the range of about 30 to about 90 wt. %, preferably about 50 to about 90 wt. %, and more preferably about 90% of the weight content of the fiber.

In certain embodiments, the toxic agents include G, V, and H class of CWA; sulfur mustard (HD), VX, tabun (GA), sarin (GB); CWA simulants such as 2-chloroethyl ethyl sulfide (2-CEES), dimethyl methylphosphonate (DMMP), dimethyl chlorophosphate (DMCP), diisopropyl methylphosphonate (DIMP), methyl dichlorophosphate (MDCP), and difluorophosphate (DFP); or hazardous chemicals such as ammonia, hydrogen chloride, sulfur dioxide, hydrogen sulfide, and cyanogen chloride.

In certain embodiments, the polymeric binder is selected from the group consisting of a coagulating polymer or a thermoresponsive polymer that may include agarose; polyvinylidene fluoride (PVDF), block copolymers that are not limited to Nafion, styrene-butadiene-styrene (SBS), styrene-isoprene-styrene (SIS), styrene-ethylene-butadiene-styrene (SEBS), styrene-ethylene-propylene-styrene (SEPS); elastomer that include but are not limited to polydimethylsiloxane, polyurethane, and latex; polymers that are soluble in water that include but are not limited to polyvinyl alcohol (PVA), polyethylenimine (PEI), polyvinylpyrrolidone (PVP), and polyamines.

In certain embodiments, the catalytic active material is selected from the group consisting of metal oxide, metal hydroxides, metal hydrates and metal organic frameworks (MOF), various other cations or anions, chemical substitutions with other elements or mixtures thereof, such as zirconium hydroxide, iron (I, II, III, and/or IV) salts (chloride, sulfide, nitrate), iron (I, II, III, and/or IV) hydroxide, lanthanide oxides, lanthanide iron oxides, manganese (II, III, and/or IV) oxide, manganese tetraoxide, manganese (II, III, and/or IV) salts (chloride, sulfide, nitrate), cobalt (II, III) oxide, cobalt salts (chloride, sulfide, nitrate), nickel (II or III) oxide, copper (I or II) oxide, copper (II) hydroxide, copper (II) salts (chloride, sulfide, nitrate), titanium oxide, and mixtures thereof.

In certain embodiments, the catalytic active material is preferably selected from the group consisting of zirconium (IV) hydroxide ($Zr(OH)_4$), metal organic frameworks (MOFs) such as UiO-66, UiO-66-amine, NU-100, PCN-250, HKUST, and mixtures thereof.

In certain embodiments, the fiber is about 200 μm to 800 μm, and preferably 300 μm to 700 μm in diameter In certain embodiments, the fiber comprises mesopores and/or micropores.

In certain embodiments, at least one chemical is immobilized onto the surface of the fiber, or embedded within the fiber to perform oxidation or hydrolysis.

In certain embodiments, $H_2O_2$ is immobilized onto the surface of the fiber.

In certain embodiments, the fiber is capable of being wound onto a spool.

In certain embodiments, the fiber is capable of being woven into a textile for protective garments and clothing; incorporated into filters; integrated into a film, wipe, fiber or polymer for use in sensing applications, integrated into filters and used as end-of-service life indicators that interact with the toxic agents.

In certain embodiments, the fiber is formed by a process of wet spinning.

A second aspect of the invention comprises a method of forming the single thread composite fibers.

In certain embodiments, the method comprises forming a dispersion of the one or more catalytic active material in a solution comprising the polymeric binder, and injecting the dispersion into a solvent.

In certain embodiments, the method comprises heating the polymeric binder prior to, or after forming, the dispersion with the catalytic active material.

In certain embodiments, the method comprises using a thermoresponsive polymer and injecting the dispersion into a solvent kept below the gel transition state temperature of the thermoresponsive polymer.

In certain embodiments, the method comprises cooling the dispersion below the gelling temperature of a thermoresponsive polymer, then forcing out with either liquid or gas.

In certain embodiments, the method comprises using a coagulating polymer, and injecting the dispersion into an appropriate solvent to form a gel-like solid or solid.

In certain embodiments, the method comprises injecting a dispersion containing the catalytic active material with or without a polymer into a polymeric binder bath.

BRIEF DESCRIPTION OF DRAWINGS

For a full understanding of the nature and advantages of the present invention, reference should be made to the following detailed description read in conjunction with the accompanying drawings.

DETAILED DESCRIPTION OF THE INVENTION

The present invention will now be described in detail with reference to the accompanying drawings.

The present invention is directed to a single thread composite fiber comprising a polymeric binder and one or more catalytic active material that reacts with a toxic agent such as chemical warfare agents, their simulants and other hazardous chemicals. The reaction may include any of capture, degradation, absorption, chemisorption and decomposition of a toxic agent. Target toxic agents may include, but are not limited to, chemical warfare agents (CWA) from G, V, and H class agents; CWAs such as sulfur mustard (HD), VX, tabun (GA) and sarin (GB); CWA simulants such as 2-chloroethyl ethyl sulfide (2-CEES), dimethyl methylphosphonate (DMMP), dimethyl chlorophosphate (DMCP), diisopropyl methylphosphonate (DIMP), methyl dichlorophosphate (MDCP), and difluorophosphate (DFP); and hazardous chemicals such as ammonia, hydrogen chloride, sulfur dioxide, hydrogen sulfide and cyanogen chloride.

Figure 1A:
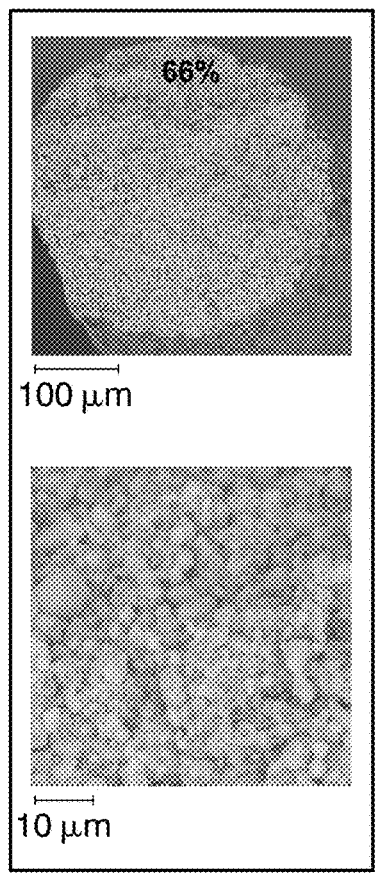
FIG. 1A is an SEM image of the single thread composite fiber comprising a single thread composite fiber with a loading content of 66% weight catalytic active material.
Figure 1B:
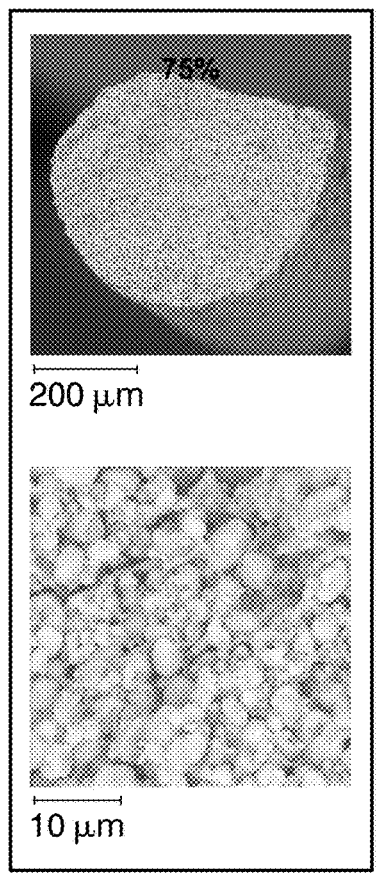
FIG. 1B is an SEM image of the single thread composite fiber comprising a single thread composite fiber with a loading content of 75% weight catalytic active material.
Figure 1C:
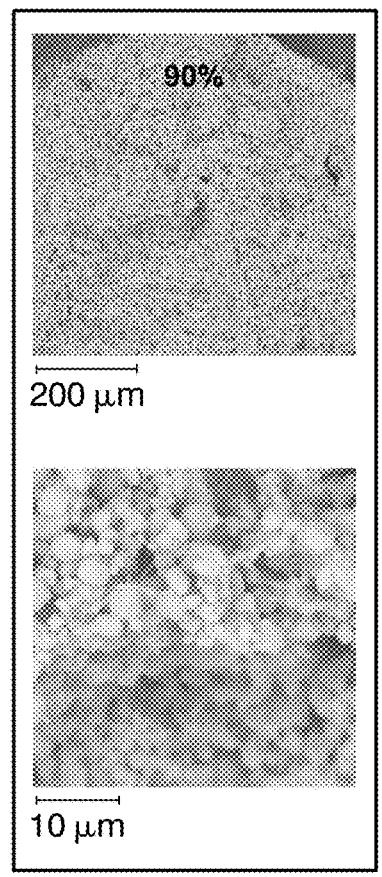
FIG. 1C is an SEM image of the single thread composite fiber comprising a single thread composite fiber with a loading content of 90% weight catalytic active material.

The single thread composite fiber of the present invention is characterized by its morphology and ability to protect against toxic agents such as CWAs. The single thread composite fiber comprises high loading of the catalytic active material. The term "high loading" is defined as the loading content of the catalytic active material up to 90% weight content of the fiber, preferably range from 30 to 90% and more preferably 50 to 90%. The diameter of the fiber ranges from 100 µm to 1 cm, preferably from 200 µm to 800 µm and more preferably 300 µm to 700 µm. As seen in FIGS. 1A-1C, FIG. 1A is a scanning electron microscope (SEM) image of a zirconium (IV) hydroxide ($Zr(OH)_4$)-agarose fiber of the present invention with 66 wt. % of $Zr(OH)_4$ and a fiber diameter of about 300 µm. FIG. 1B is an SEM image of a $Zr(OH)_4$-agarose fiber of the present invention with 75 wt. % of $Zr(OH)_4$ and a fiber diameter of about 500 µm. FIG. 1C is an SEM image of a $Zr(OH)_4$-agarose fiber of the present invention with 90 wt. % of $Zr(OH)_4$ and a fiber diameter of about 660 µm.

Figure 5:
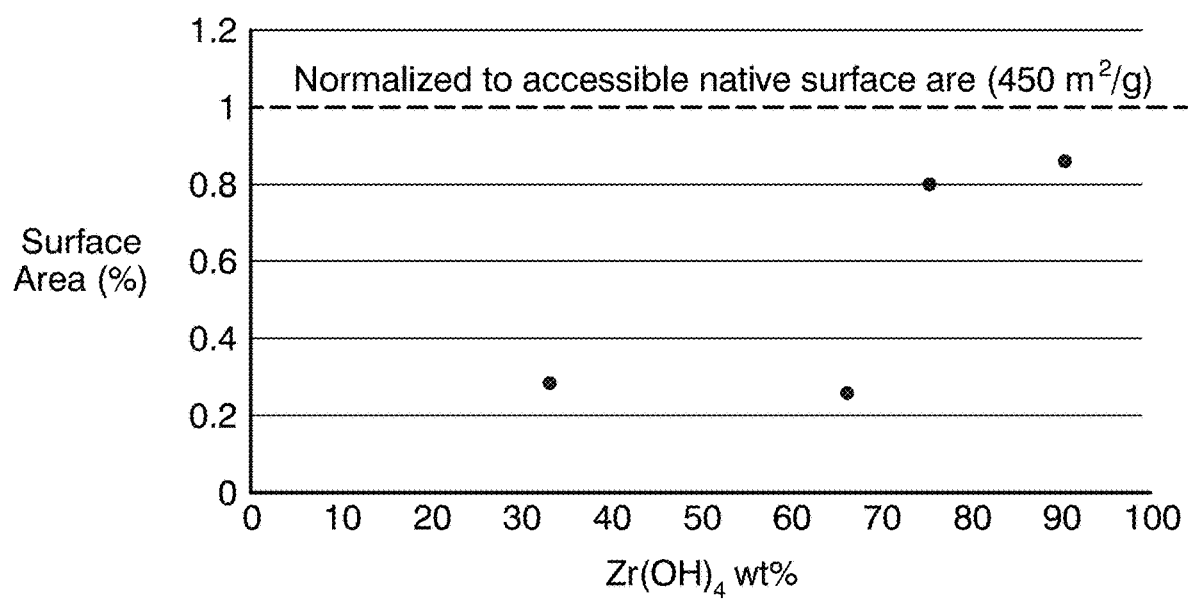
FIG. 5 is a graph showing the surface area of the fiber composite as a function of $Zr(OH)_4$ catalytic active material loading, as measured by $N_2$ adsorption.

The porosity of the fibers of the present invention range on the micro and mesa scale according to the IUPAC definition as pores smaller than 400 nm. Preferably, the porosity of the fiber of the present invention comprises pores sizes ranging from 1 nm to less than 400 nm, more preferably 10 nm to 400 nm, and most preferably from 50 nm to less than 400 nm. The fibers of the present invention have a surface area of up to 2,500 m$^2$/g, preferably between 25 m$^2$/g and 2,500 m$^2$/g. FIG. 5 is a graph showing the surface area of a $Zr(OH)_4$-agarose fiber of the present invention as a function of $Zr(OH)_4$ loading, as measured by $N_2$ adsorption.

Polymeric binders suitable for the present invention may be a thermoresponsive polymer or a coagulating polymer. A thermoresponsive polymer is a polymer that has thermoresponsive properties, and exhibits a discontinuous change in its physical properties with temperature. A coagulating polymer is a polymer that coagulates when injected into an appropriate solvent. The coagulation process of the coagulating polymer is a process of a liquid, i.e. the polymer solution, becoming a gel-like solid or solid. Polymeric binders of the present invention are selected from the group consisting of agarose, polyvinylidene fluoride (PVDF); block copolymers such as Nafion, styrene-butadiene-styrene (SBS), styrene-isoprene-styrene (SIS), styrene-ethylene-butadiene-styrene (SEBS), styrene-ethylene-propylene-styrene (SEPS); elastomer such as polydimethylsiloxane, and latex; polymers that are soluble in water such as polyvinyl alcohol (PVA), polyethylenimine (PEI), polyvinylpyrrolidone (PVP), and polyamines. In the single threaded composite fiber, binder is present in the amount of 10 to 70 wt. %, preferably 10 to 50 wt. % of the fiber.

Catalytic active materials suitable for the present invention react with toxic agents, especially CWAs and CWA simulants. Suitable catalytic active materials are selected from the group consisting of iron (I, II, III, and/or IV) salts (chloride, sulfide, nitrate), zirconium hydroxide, iron (I, II, III, and/or IV) hydroxide, lanthanide oxides, lanthanide iron oxides, manganese (II, III, and/or IV) oxide, manganese tetraoxide, manganese (II, III, and/or IV) salts (chloride, sulfide, nitrate), cobalt (II, III) oxide, cobalt salts (chloride, sulfide, nitrate), nickel (II or III) oxide, copper (I or II) oxide, copper (II) hydroxide, copper (II) salts (chloride, sulfide, nitrate), and mixtures thereof. A preferred metal oxide is zirconium hydroxide. Suitable catalytic active materials can also be metal organic frameworks selected from the group consisting of UiO-66, UiO-66-amine, NU-100, PCN-250 and HKUST.

Figure 2:
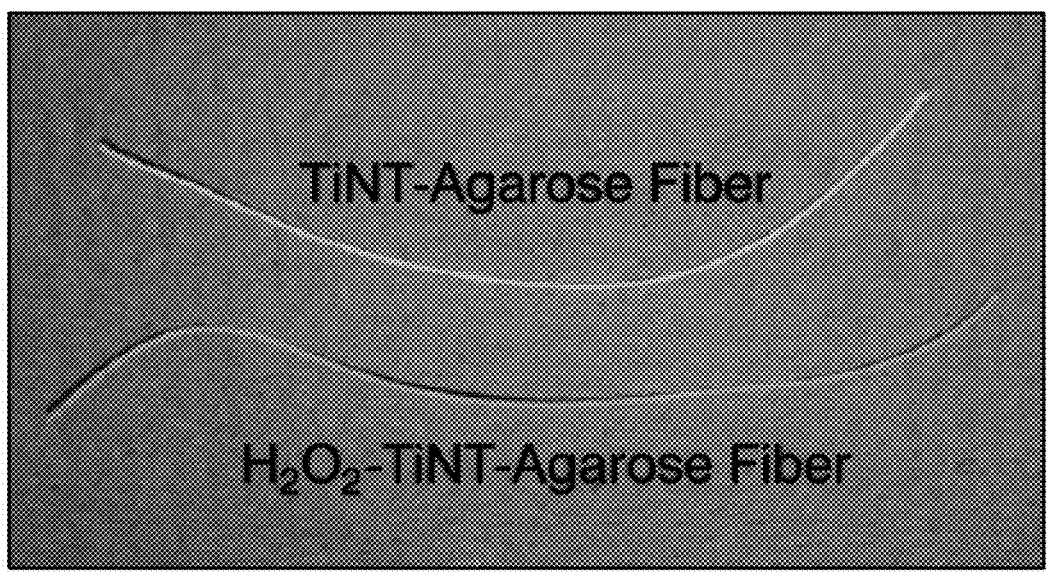
FIG. 2 is a photograph of a single thread titanium nanotube-agarose composite fiber (top) and a single thread titanium nanotube-agarose composite fiber with immobilized $H_2O_2$ (bottom).

The single thread composite fiber of the present invention may be further modified to comprise an immobilized reactive additive on the surface of the catalytic active material, and on the surface of the fiber. Suitable additives are selected from the group consisting of perchlorates, persulfates, organic peroxides, inorganic peroxides, alkali metal peroxide, alkali metal oxides, and mixtures thereof. FIG. 2 is a photograph showing a titania nanotube (TiNT)-agarose fiber (top) and a similar fiber whereby $H_2O_2$ has been immobilized (bottom), resulting in a color change of the fiber from white to yellow. Methods of immobilizing the reactive additive into fibers are well known in the art.

Another aspect of the present invention is a method for producing the single thread composite fiber. The fibers of the present invention may be produced by manufacturing techniques such as wet spinning, dry spinning and extrusion. In one embodiment, the method of forming said fibers comprises: forming a uniform dispersion of the one or more catalytic active material in a solution comprising the polymeric binder and injecting the dispersion into a solvent bath. In one embodiment, the binder is admixed in a solution of $H_2O$, or other polar protic solvents such as alcohols (ethanol, propanol, 2-propanol, butanol etc. . . . ), formic acid, methanol, acetic acid; polar aprotic solvents such as tetrahydrofuran (THF), ethyl acetate, acetone, dimethylformamide, acetonitrile, dimethyl sulfoxide (dmso). Non-polar solvents such as pentane, cyclopentane, hexane, cyclohexane, benzene, tolulene, 1,4-dioxane, chloroform, diethyl ether, dichloromethane are also useful as solvents. In another embodiment, wherein the polymeric binder is a thermoresponsive polymer, the thermoresponsive polymer is first heated to a temperature within the range where the thermoresponsive polymer becomes soluble in a solvent to form the solution before forming the dispersion and then injecting the dispersion in a solvent bath that is kept below the gel transition state temperature of the polymer. Alternatively, the dispersion is allowed to cool below the polymer gelling temperature and then force out with either liquid or gas into different sized tubes for molding. In yet another embodiment, where the polymeric binder is a coagulating polymer, the dispersion is injected into a solvent bath that may include a solvent that cause or induces coagulation of the polymer, including but not limited to solvents such as water, ethanol, methanol, propanol, acetone, hexane, benzene, chloroform, and mixtures thereof. Alternatively, in another embodiment of the method, the solvent bath may be the coagulating polymer, while the dispersion contains the catalytic active material with or without additional polymer. Once formed, the single thread composite fiber of the present invention can be extracted and allowed to dry.

Multiple fibers of the single thread composite fiber of present invention may be included in different architectures such as a woven textile or yarn by twisting several fibers together. The textiles or yarns thus formed may be used to produce fabrics capable of absorbing and reacting with toxic agents. The fibers of the present invention may be incorporated into a wide range of products such as protective suits, clothing and filters. Further, the fibers of the present invention may be integrated into a film, wipe, fiber or polymer for use in sensing applications.

It must be noted that the single threaded composite fiber of the present invention is entirely different from the "electrospun" fibers known in the prior art, inasmuch as the electrospun "fibers" in the literature exists as a non-woven mat, and consist of hundreds of thousands of nano-sized fibers with a distribution of thicknesses.

Example 1

Formation of UiO-66-Amine-Agarose Single Thread Composite Fiber by Wet Spinning Process.

Powder agarose was added to water and the mixture was heated to between 40-120° C. to form a 2 wt. % agarose solution. Metal organic framework (MOF) UiO-66-amine was dispersed in the solution to form a dispersion. The dispersion was injected into a water bath kept below 40° C. to form the single thread composite fiber. The fiber was extracted from the bath and allowed to air dry.

Example 2

Reactivity of Zirconium (IV) ($Zr(OH)_4$)-Agarose Against Various Toxic Agents.

The reactivity of $Zr(OH)_4$-agarose single thread composite fibers with 90% loading content were demonstrated with 2-chloroethyl ethyl sulfide (2-CEES), a simulant for sulfur mustard and dimethyl 4-nitrophenylphosphate (DMNP), a simulant for organophosphorus nerve agents such as GB and GD.

Figure 3:
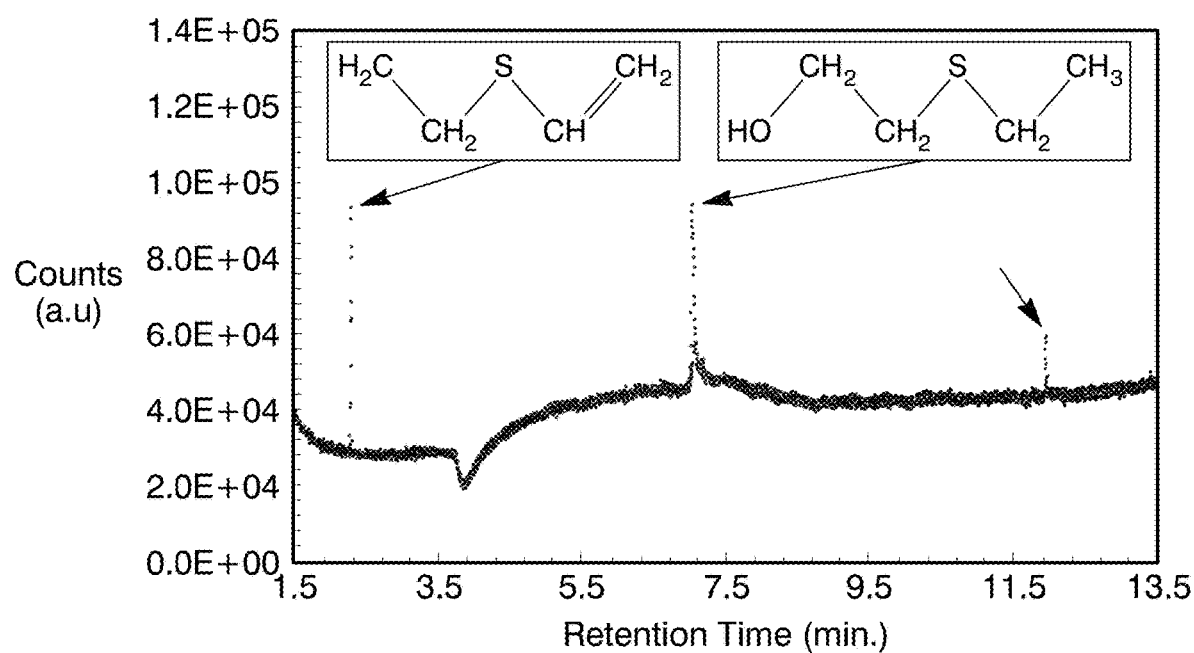
FIG. 3 is a graph showing GC-MS results of $Zr(OH)_4$ catalytic active material fibers with 90% weight content catalyst dosed with 2-CEES for 24 hr. Products are shown with their peaks in the chromatograph.

FIG. 3 is the gas chromatography/mass spectrometry (GC-MS) results that show the reactivity of the $Zr(OH)_4$-agarose single thread composite fibers dosed with HD mustard simulant, 2-CEES, for 24 hours. GC-MS results show complete degradation of the simulant to non-toxic products HEES and EVS after a period of 24 hours. Products are shown with their peaks in the chromatograph.

Figure 4:
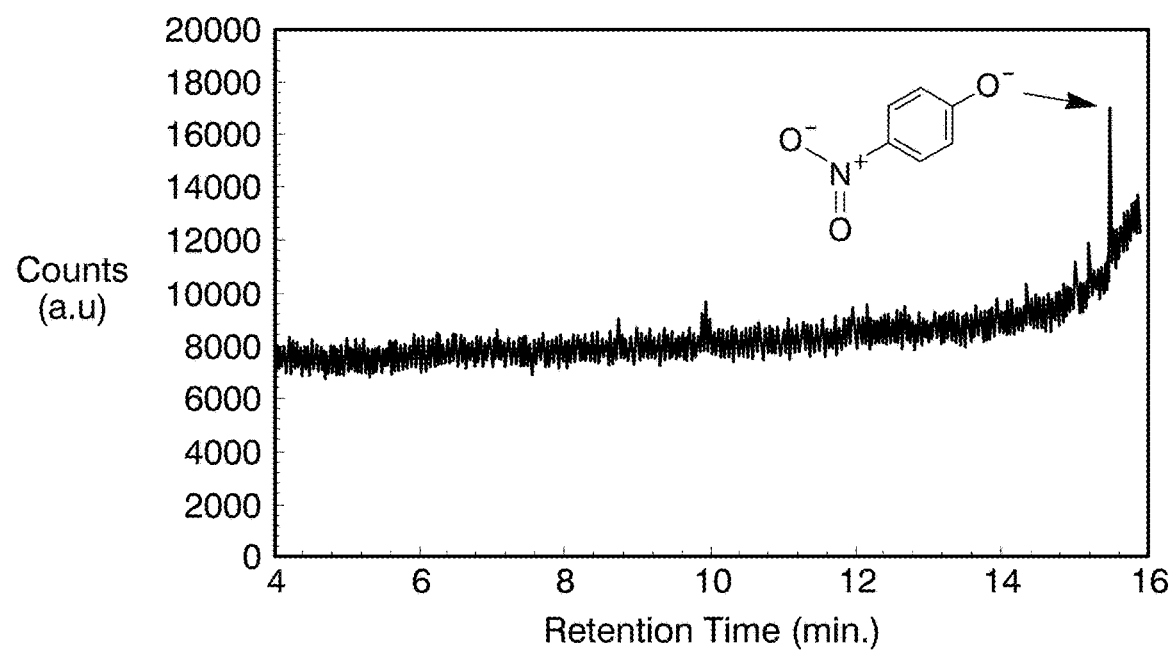
FIG. 4 is a graph showing GC-MS results of $Zr(OH)_4$ catalytic active material fibers with 90% weight content catalysts dosed with DMNP for 24 hr. Products are shown with their peaks in the chromatograph

FIG. 4 is the GC-MS results that show the reactivity of the $Zr(OH)_4$-agarose single thread composite fibers dosed with nerve agent simulant DMNP for 24 hours. GC-MS results demonstrate the reactivity by the presence of the hydrolysis product: nitrophenoxide anion. Products are show with their peaks in the chromatograph.

REFERENCES

1. Bandosz, T. J. et al. Reactions of VX, GD, and HD with Zr(OH)4: Near Instantaneous Decontamination of VX. The Journal of Physical Chemistry C 116, 11606-11614, doi:10.1021/jp3028879 (2012).
2. Lu, A. X. et al. MOFabric: Electrospun Nanofiber Mats from PVDF/UiO-66-NH2 for Chemical Protection and Decontamination. ACS Applied Materials & Interfaces 9, 13632-13636, doi:10.1021/acsami.7b01621 (2017).

The invention claimed is:

1. A composite fiber, comprising: a single thread comprising at least one polymeric binder and at least one catalytic active material, wherein said polymeric binder is agarose and said catalytic active material is reactive with at least one toxic chemical or agent and is selected from the group consisting of $Zr(OH)_4$ and a metal organic frameworks, and wherein said fiber further includes at least one reactive additive selected from the group consisting of perchlorates, persulfates, organic peroxides, inorganic peroxides, alkali metal peroxide, alkali metal oxides, and mixtures thereof and wherein said fiber comprises a single thread produced by a wet spinning process.

2. The fiber of claim 1, wherein said catalytic active material comprises 30 to 90 wt. % of said fiber.

3. The fiber of claim 1, wherein said $Zr(OH)_4$ comprises 50 to 90 wt. % of said fiber.

4. The fiber of claim 3, wherein said $Zr(OH)_4$ comprises 90 wt. % of said fiber.

5. The fiber of claim 1, wherein said metal organic framework is selected from the group consisting of UiO-66, UiO-66-amine, NU-100, PCN-250 and HKUST.

6. The fiber of claim 1, wherein said polymeric binder is agarose and said catalytic active material is a metal organic framework.

7. The fiber of claim 1, wherein said fiber further includes chemicals immobilized on or within said fiber that can perform oxidation or hydrolysis.

8. The fiber of claim 1, wherein said fiber has a diameter of about 100 μm to 1 cm.

9. The fiber of claim 8, wherein said fiber has a diameter of about 200 μm to 800 μm.

10. The fiber of claim 1, wherein said fiber has pore sizes in the range of about 1 nm to less than 400 nm.

11. The fiber of claim 1, wherein said fiber has a surface area in the range of about 25 $m^2$/g to 2,500 $m^2$/g.

12. The fiber of claim 1, wherein a plurality of said fibers are used to make yarns, textiles, protective garments, filtration materials, and decontamination wipes.

13. The fiber of claim 1, wherein said toxic chemical or agent is selected from the group consisting of: chemical warfare agents, chemical warfare agent simulants, and toxic industrial chemicals.

14. The fiber of claim 13, wherein said chemical warfare agents are selected from G, V, and H-class agents, and said toxic industrial chemicals are selected from ammonia, hydrogen chloride, sulfur dioxide, hydrogen sulfide, and cyanogen chloride.

15. A composite fiber, comprising: a single thread comprising at least one polymeric binder and at least one catalytic active material, wherein said polymeric binder is a block copolymer selected from the group consisting of sulfonated tetrafluoroethylene fluoropolymer copolymer, styrene-butadiene-styrene (SBS), styrene-isoprene-styrene (SIS), styrene-ethylene-butadiene-styrene (SEBS) and styrene-ethylene-propylene-styrene (SEPS); and said catalytic active material is reactive with at least one toxic chemical or agent and is selected from the group consisting of $Zr(OH)_4$ and a metal organic frameworks, and wherein said fiber further includes at least one reactive additive selected from the group consisting of perchlorates, persulfates, organic peroxides, inorganic peroxides, alkali metal peroxide, alkali metal oxides, and mixtures thereof, and wherein said fiber comprises a single thread produced by a wet spinning process.

16. The fiber of claim 15, wherein said metal organic framework is selected from the group consisting of UiO-66, UiO-66-amine, NU-100, PCN-250 and HKUST.

* * * * *